United States Patent [19]
Bakuya et al.

[11] Patent Number: 5,680,614
[45] Date of Patent: Oct. 21, 1997

[54] RELATIONAL DATABASE MANAGEMENT SYSTEM

[75] Inventors: Takao Bakuya; Masato Matsui, both of Tokyo, Japan

[73] Assignee: NEC Corporation, Tokyo, Japan

[21] Appl. No.: 63,746

[22] Filed: May 20, 1993

[30] Foreign Application Priority Data

May 20, 1992 [JP] Japan .................................. 4-126952

[51] Int. Cl.⁶ .................................................... G06F 17/30
[52] U.S. Cl. .......................... 395/614; 395/602; 395/604; 395/611; 395/613; 395/333; 395/339; 395/348; 395/500; 395/793; 395/794
[58] Field of Search .............................. 395/500, 700, 395/600, 161, 159; 364/419

[56] References Cited

U.S. PATENT DOCUMENTS

| | | | |
|---|---|---|---|
| 5,197,005 | 3/1993 | Shwartz et al. | 364/419 |
| 5,257,185 | 10/1993 | Farley et al. | 364/419 |
| 5,295,256 | 3/1994 | Bapat | 395/500 |
| 5,317,742 | 5/1994 | Bapat | 395/700 |
| 5,339,392 | 8/1994 | Risberg et al. | 395/161 |
| 5,414,838 | 5/1995 | Kolton et al. | 395/600 |
| 5,421,008 | 5/1995 | Banning et al. | 395/650 |
| 5,430,872 | 7/1995 | Dahod et al. | 395/600 |
| 5,491,783 | 2/1996 | Douglas et al. | 395/159 |

*Primary Examiner*—Thomas G. Black
*Assistant Examiner*—Cheryl Lewis
*Attorney, Agent, or Firm*—Foley & Lardner

[57] ABSTRACT

In a database management system of the present invention, a trigger definition means which defines activation condition an contents of a triggered operation activated upon execution of updating for a table further defines an operation where an exception is generated for an update request against the constraint given to the table, or a triggered operation based on the reference constraint given among a plurality of tables, or a triggered operation based on the relations among the system tables contained in the system directory. The trigger definition means also specifies an operation mode as a condition for execution of the triggered operation. The trigger execution means executes the triggered operation when the trigger operation mode designated by the update request and the operation mode specified in the trigger definition are the same and does not execute any trigger execution when they are not the same.

12 Claims, 14 Drawing Sheets

FIG. 5A

```
CREATE TRIGGER TRG1 BEFORE DELETE ON EMPLOYEE
REFERENCES OLD AS RESIGNED_EMPLOYEE
WHEN ( RESIGNED_EMPLOYEE.TITLE IS NOT NULL )
    ( UPDATE EMPLOYEE SET EMPLOYEE.SUPERIOR = NULL
      WHERE EMPLOYEE.SUPERIOR = RESIGNED_EMPLOYEE.EMPLOYEE_NUMBER ) ;
```

FIG. 5B

```
CREATE TRIGGER TRG2 BEFORE INSERT ON EMPLOYEE
REFERENCES NEW AS NEW_EMPLOYEE
WHEN ( NEW_EMPLOYEE.ASSIGNMENT NOT IN ( SELECT SECTION_NUMBER FROM SECTION ) )
    ( RAISE EXCEPTION CODE = 'CONSTRAINT VIOLATION' ) ;
```

FIG. 5C

```
CREATE TRIGGER TRG3 BEFORE DELETE ON EMPLOYEE
MODE = RESTRICT
REFERENCES OLD AS RESIGNED_EMPLOYEE
WHEN ( EXISTS ( SELECT * FROM EMPLOYEE
                WHERE EMPLOYEE.SUPERIOR = RESIGNED_EMPLOYEE.EMPLOYEE_NUMBER ) )
    ( RAISE EXCEPTION CODE = 'RESTRICT VIOLATION' ) ;
```

FIG. 6

CREATE TABLE EMPLOYEE
   ( EMPLOYEE_NUMBER INTEGER,
     SECTION_NAME    NCHAR (20),
                    :
     CHECK ( EMPLOYEE_NUMBER BETWEEN 1 AND 999999 )
  );

FIG. 7A

CREATE TABLE SECTION
(SECTION_NUMBER INTEGER PRIMARY KEY
NAME          NCHAR (2 0),
AREA_NAME     NCHAR (2 0),
              :
);

CREATE TABLE SECTION
(EMPLOYEE_NUMBER INTEGER PRIMARY KEY,
NAME            NCHAR (2 0),
ASSIGNMENT      INTEGER FOREIGN KEY
                    REFERENCES SECTION. SECTION_NUMBER
                    ON UPDATE CASCADE
                    :
);

FIG. 7B

| SECTION | | |
|---|---|---|
| SECTION_NUMBER | SECTION_NAME | AREA_NAME |
| 100 | HEAD OFFICE | TOKYO |
| 200 | DEVELOPMENT | OSAKA |
| 300 | MANUFACTURING | NAGOYA |
| ⋮ | ⋮ | ⋮ |

FIG. 7C

| EMPLOYEE | | |
|---|---|---|
| EMPLOYEE_NUMBER | NAME | ASSIGNMENT |
| 61000 | TANAKA, ICHIRO | 200 |
| 61001 | SUZUKI, JIRO | 100 |
| 62300 | YAMADA, SABURO | 100 |
| ⋮ | ⋮ | ⋮ |

FIG. 8A

CREATE VIEW HEAD_OFFICE_EMPLOYEE AS
SELECT * FROM EMPLOYEE
WHERE EMPLOYEE.ASSIGNMENT = 100;

CREATE VIEW TOKYO_EMPLOYEE AS
SELECT * FROM EMPLOYEE
WHERE EMPLOYEE.ASSIGNMENT IN (SELECT SECTION_NUMBER FROM SECTION
    WHERE AREA_NAME = N'TOKYO');

FIG. 9

```
CREATE TABLE EMPLOYEE
( EMPLOYEE_NUMBER INTEGER,
  NAME             NCHAR (20) ,
    ..
  CHECK ( EMPLOYEE_NUMBER BETWEEN 1 AND 999999 )
);

⇒ CREATE TRIGGER EMPLOYEE_CK001 BEFORE INSERT ON EMPLOYEE
  REFERENCES NEW AS NEWREC
  WHEN ( NOT ( NEWREC. EMPLOYEE_NUMBER BETWEEN 1 AND 999999) )
  ( RAISE EXCEPTION CODE= 'CONSTRAINT VIOLATTION ');
```

FIG. 10A

```
CREATE TABLE SECTION
(SECTION_NUMBER INTEGER PRIMARY KEY,
SECTION_NAME    NCHAR (2 0),
AREA_NAME       NCHAR (2 0),
                :
);

CREATE TABLE EMPLOYEE
(EMPLOYEE_NUMBER INTEGER PRIMARY KEY,
NAME             NCHAR (2 0),
ASSIGNMENT       INTEGER FOREIGN KEY
                 REFERENCES SECTION. SECTION_NUMBER
                 ON UPDATE CASCADE
                 :
);
```

FIG. 10B

```
→ CREATE TRIGGER EMPLOYEE_FK_INS_001 BEFORE INSERT ON EMPLOYEE
  REFERENCES NEW AS NEWREC
  WHEN ( NOT EXISTS( SELECT * FROM SECTION
                    WHERE SECTION.SECTION_NUMBER = NEWREC.ASSIGNMENT ) )
       ( RAISE EXCEPTION CODE= 'REFERENTIAL CONSTRAINT VIOLATION' );

CREATE TRIGGER EMPLOYEE_FK_UPD_001 AFTER UPDATE ON SECTION
  REFERENCES NEW AS NEWREC
  REFERENCES OLD AS OLDREC
  WHEN ( OLDREC.SECTION_NUMBER <> NEWREC.SECTION_NUMBER )
       ( UPDATE EMPLOYEE SET EMPLOYEE.ASSIGNMENT = NEWREC.SECTION_NUMBER
         WHERE EMPLOYEE.ASSIGNMENT = OLDREC.SECTION_NUMBER );

CREATE TRIGGER EMPLOYEE_FK_DEL_001 BEFORE DELETE ON SECTION
  REFERENCES OLD AS OLDREC.
  WHEN ( EXISTS( SELECT * FROM EMPLOYEE
                 WHERE EMPLOYEE.ASSIGNMENT = OLDREC.SECTION_NUMBER ) )
       ( RAISE EXCEPTION CODE= 'RESTRICT VIOLATION ');
```

FIG. 11

```
CREATE TRIGGER TABLES_DEL_001 BEFORE DELETE ON TABLES
MODE = RESTRICT
REFERENCES OLD AS OLDREC
WHEN ( EXISTS ( SELECT * FROM VIEW_TABLE_
               WHERE VIEW_TABLE_USAGE.TABLE_MAME = OLDREC.TABLE_NAME ) )
    ( RAISE EXCEPTION CODE= 'REFERENCED OBJECT STILL EXISTS' );

CREATE TRIGGER TABLES_DEL_001 BEFORE DELETE ON TABLES
MODE = CASCADE
REFERENCES OLD AS OLDREC
WHEN ( EXISTS ( SELECT * FROM VIEW_TABLE_
               WHERE VIEW_TABLE_USAGE.TABLE_MAME = OLDREC.TABLE_NAME ) )
    ( DELETE FROM TABLES
             WHERE VIEW_TABLE_USAGE, TABLE_NAME=OLDREC. TABLE_NAME);
    DELETE FROM VIEW_TABLE_USAGE
             WHERE TABLE_NAME IN OLDREC.TABLE_NAME
    );
```

RELATIONAL DATABASE MANAGEMENT SYSTEM

BACKGROUNDS OF THE INVENTION

1. Field of the Invention

The present invention relates to a database management system, and particularly relates to a database management system used in a relational database.

2. Description of the Prior Art

A conventional relational database system uses a special group of tables called a system directory to store information on database resources such as tables, columns and index defined in the database, relations among such resources, and access privilege of individual resource users. When a user requests a search of the database, the system refers to the system directory to check existence of the resource to be searched, the resource type and the access privilege. It is provided with a trigger definition means to define trigger contents so as to register the operation activated upon execution of an update, such as addition, replacement or deletion of a record for a table defined in the database (triggered operation). It is further provided with a trigger execution means to execute the triggered operation according to the trigger definition.

In such a conventional database system, constraints given to the tables defined in the database (table constraints) are kept by generating an exception for an update request against them. Specifically, when a user requests an update of a table, the system acquires the constraints defined for that table to check whether the requested update has contents against the constraints, and, if so, generates an exception to keep the table constraints. All of these steps are performed by a data manipulation means in the database system.

Such a system also keeps operations upon update of related records according to reference constraints given to the relations among a plurality of tables defined in the database (reference operations). Conventionally, when a user requests an update for a table, the system acquires the reference constraints defined for that table, checks whether it is necessary for update request contents to cause reference constraint operation, and if so, executes the processing defined as the reference constraint operation in order to keep the reference constraints. These steps are also performed by the data manipulation means.

Such a database system is further provided with a resource manipulation means incorporated in its database management system. It is in charge of all processes to reflect the results of resource manipulations such as resource definition/deletion and privilege grant/revoke at the tables in the system directory.

A conventional trigger definition comprises:
(1) Trigger activation timing to indicate when the trigger is to be made (to specify before or after the addition, replacement or deletion of a record to the table);
(2) Trigger search condition to judge whether the triggered operation is to be executed or not (the system proceeds to execution of the triggered operation only when the trigger search condition is true); and
(3) Contents of triggered operation to be executed only when the trigger search condition is true (Specification is limited to update request for a table).

A trigger search condition is, for example, existence of an index for a triggered operation to delete the table and the index at the same time. In this case, only when there exists an index, the trigger search condition is true, and the above triggered operation is executed.

In the conventional method where the constraints given to the tables defined in the database (table constraints) are kept by generation of an exception for an update request against them and where the reference operations are made upon update of related records according to reference constraints given to the relations among a plurality of tables defined in the database, the data manipulation means has to perform complicated processing. Its checking of constraints and reference operation are substantially equivalent to the functions of the trigger execution means, which causes much redundancy.

More specifically, the function to evaluate the trigger search condition at the trigger execution means and the function to check the table constraints/reference constraints at the data manipulation means are equivalent, and the function to execute triggered operation at the trigger execution means and the function to process reference constraint operations at the data manipulation means are equivalent.

In a conventional system, however, table constraints and reference constraints are kept by the data manipulation means only and triggering is not utilized. This results in excessively complicated processing by the data manipulation means.

Similarly, in the conventional method where the system directory management means incorporated in the database management system serves for reflecting the results of resource manipulations such as resource definition/deletion and privilege grant/revoke at the tables in the system directory, both the system directory management means and the data manipulation means have to perform complicated processing. The function for system directory update at the system directory management means is substantially equivalent to the function of the trigger execution means, which causes much redundancy of processing.

However, the trigger cannot be utilized for system directory management in the conventional system, since it is impossible for the conventional trigger definition to change the triggered operation according to the status at execution timing, though different users request different contents of update for the system directory for resource manipulation. Supposing for example that a user requests a resource deletion, a related resource may be treated as an exception or simultaneously deleted according to the contents of the request. The conventional system, however, cannot be controlled so as to select one of the operations which have been defined in advance as triggered operations.

Besides, incorporation of the algorithm for system directory management to the system directory management means prevents the database system from being customized for resource manipulation.

SUMMARY OF THE INVENTION

A first object of the present invention is to provide a relational database management system which utilizes trigger operations for updating with table and reference constraints in update process of the tables in the database so as to simplify the processing by the data manipulation means and thereby improves quality and facility of maintenance.

A second object of the present invention is to provide a relational database management system which utilizes trigger operations for system directory management so as to simplify the processing by the system directory management means and at the same time to enable customization of the database system for resource manipulation.

According to a preferred embodiment of the present invention to attain the above first object, a relational database management system comprises a database to store tables, a data manipulation means to update a record in the table defined in the database upon update request for the record, a trigger definition means to define activation condition and contents of a triggered operation activated upon execution of updating for the table, and a trigger execution means to activate the triggered operation according to the definition given by the trigger definition means and process the triggered operation with invoking the data manipulation means, and is characterized by that the trigger definition means generates a definition to cause an exception to be generated for an update request against constraints given to the table and the trigger execution means executes exception generation without invoking the data manipulation means for an update request violating the constraint given to the table according to the definition by the trigger definition means.

According to a still preferred embodiment of the present invention, the trigger definition means specifies an operation mode as a condition for execution of the triggered operation and the trigger execution means executes the triggered operation only when the trigger operation mode designated by the update request and the operation mode specified in the trigger definition are the same and does not execute the triggered operation when they are not the same.

According to a further preferred embodiment of the present invention, the trigger definition means defines the contents of a triggered operation based on reference constraints given for a plurality of tables defined in the database, and the trigger execution means invokes the data manipulation means and processes the triggered operation based on the reference constraint defined by the trigger definition means and executes exception generation when the update request is against the reference constraint.

According to a still preferred embodiment of a relational database management system, the trigger definition means specifies an operation mode as a condition for execution of the triggered operation and the trigger execution means executes the triggered operation only when the trigger operation mode designated by the update request and the operation mode specified in the trigger definition are the same and does not execute the triggered operation when they are not the same.

According to another preferred embodiment of the present invention to attain the above first object, a relational database management system comprises a database to store tables, a data manipulation means to update a record in the table defined in the database upon update request for the record, a trigger definition means to define activation condition and contents of a triggered operation activated upon execution of updating for the table, and a trigger execution means to activate the triggered operation according to the definition given by the trigger definition means and process the triggered operation with invoking the data manipulation means, and is characterized by that the trigger definition means defines the contents of a triggered operation based on reference constraints given for a plurality of tables defined in the database, and the trigger execution means invokes the data manipulation means and processes the triggered operation based on the reference constraint defined by the trigger definition means and executes exception generation when the update request is against the reference constraint.

According to a still preferred embodiment, the trigger definition means specifies an operation mode as a condition for execution of the triggered operation and the trigger execution means executes the triggered operation only when the trigger operation mode designated by the update request and the operation mode specified in the trigger definition are the same and does not execute the triggered operation when they are not the same.

According to another preferred embodiment of the present invention to attain the above second object, a relational database management system comprises a database to store tables, a system directory to store information on resources including tables, columns and indices defined in the database, relations among the resources and access privilege for the resources as system tables, a data manipulation means for updating of records including addition, replacement and deletion for the tables in the database and updating of the system directory, a trigger definition means to define activation condition and contents of a triggered operation activated upon execution of updating for the table, a trigger execution means to activate the triggered operation according to the definition given by the trigger definition means and process the triggered operation with invoking the data manipulation means, a resource manipulation means for resource manipulations such as resource definition/deletion and privilege grant/revoke and a system directory management means to reflect the results of resource manipulation processing by the resource manipulation means with invoking the data manipulation means to the system tables in the system directory, and is characterized by that the trigger definition means defines the triggered operation based on the relations among the system tables in the system directory.

According to still another preferred embodiment, the trigger definition means specifies an operation mode as a condition for execution of the triggered operation and the trigger execution means executes the triggered operation only when the trigger operation mode designated by the update request and the operation mode specified in the trigger definition are the same and does not execute the triggered operation when they are not the same.

According to another preferred embodiment, the trigger definition means defines a plurality of operation modes and a triggered operation for each operation mode and is characterized by that the trigger execution means executes, only when the trigger operation mode designated by the update request and the operation mode specified in the trigger definition are the same, a triggered operation corresponding to the trigger operation mode selectively and does not execute the triggered operation when they are not the same.

Other objects, characteristics and effects of the present invention will be clarified in the detailed description below.

BRIEF DESCRIPTION OF THE DRAWINGS

FIGS. 5A, 5B and 5C are explanatory views of a trigger definition example;

FIG. 6 is an explanatory view of a table constraint example;

FIGS. 7A, 7B and 7C are explanatory views of a reference constraint example;

FIGS. 8A and 8B are explanatory views of an example showing a management method for relations between the BASE and VIEW tables in the system directory;

FIG. 9 is an explanatory view of an example for trigger definition generation based on table constraints;

FIGS. 10A and 10B are explanatory views of an example for trigger definition generation based on reference constraints; and FIG. 11 is an explanatory view of an example for trigger definition for the system directory.

DESCRIPTION OF THE PREFERRED EMBODIMENT

Referring to the attached figures, preferred embodiments of the present invention will be described in details below.

Figure 1:
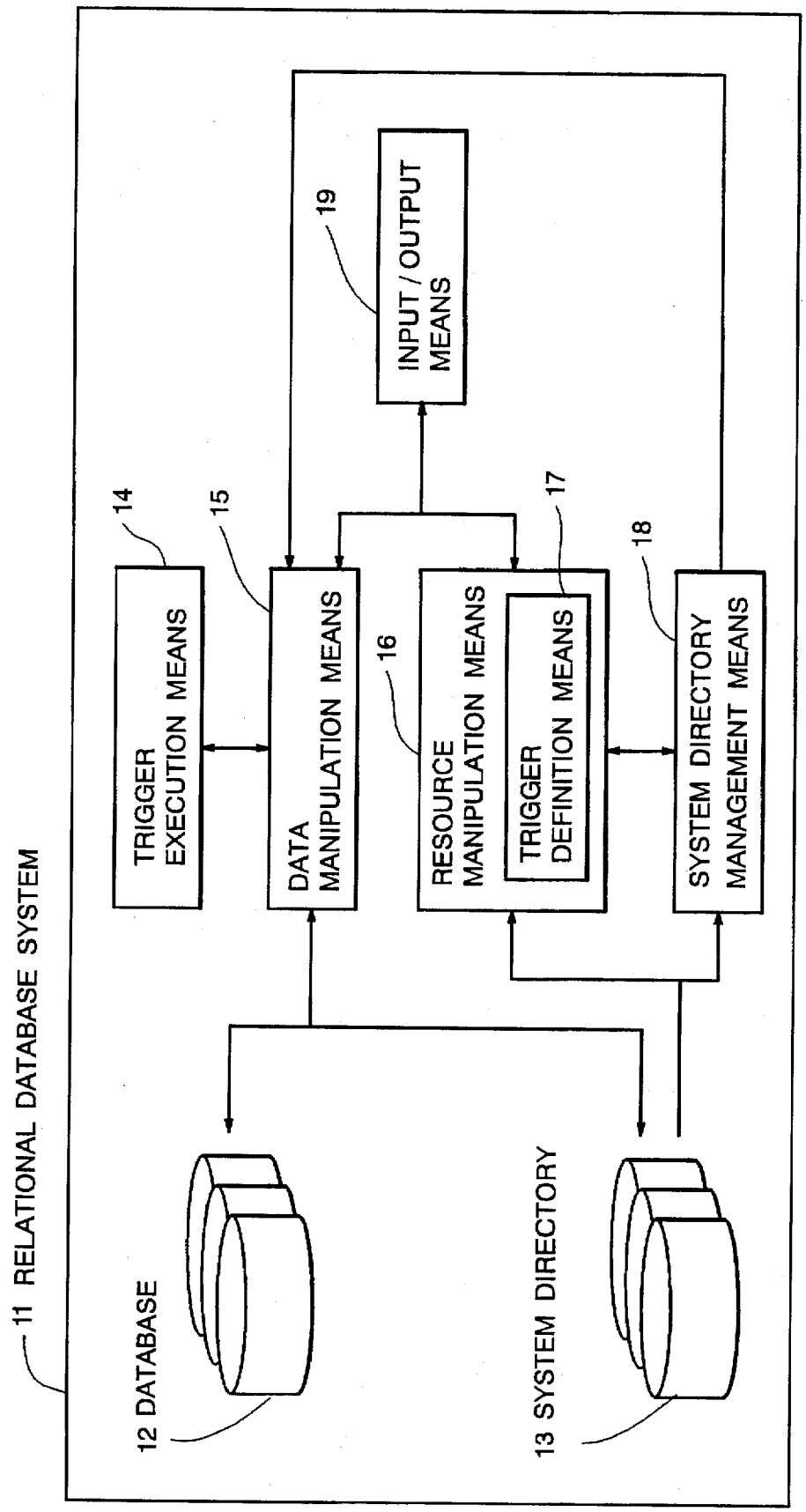
FIG. 1 is a block diagram to show the configuration of an embodiment for a relational database management system according to the present invention.

FIG. 1 shows the configuration of a preferred embodiment of a relational database system where the present invention is applied. In the figure, a database system 10 comprises a database 12, a system directory 13 to store information on database resources such as tables, columns and index defined in the database, relations among such resources and access privilege of the individual users for such resources, a trigger execution means 14 to activate triggered operation, a data manipulation means 15 to update or search a table defined in the database 12 or to update the system directory 13, a resource manipulation means 16, a trigger definition means 17 provided at the resource manipulation means 16, a system directory management means 18 and an input/output means 19 including a keyboard and a display.

A user of the database system 10 specifies via the input/output means 19 search or update request for the database 12 or a resource manipulation request to manipulate a table, column or index for the system directory 13. Result of the user's request (including abnormal end with exception generation) is returned to the user also via the input/output means 19 such as display.

When a user requests a resource manipulation for the system directory 13, the resource manipulation means 16 serves for it. If the requested resource manipulation is a trigger definition, the resource manipulation means 16 invokes the trigger definition means 17 and generate information on trigger.

If the requested resource manipulation involves table or reference constraints, trigger definitions corresponding to their definitions are internally processed before the resource manipulation means 16 invokes the trigger definition means 17 and generate information on trigger.

The trigger definition means 17 generates information in a form registrable to the system directory 13 based on the trigger definition. Unlike a conventional trigger definition means, the present trigger definition means 17 can specify as the triggered operation not only updating but also exception generation.

The trigger execution means 14 is invoked by the data manipulation means 15 and evaluates trigger search conditions to proceed to the triggered operation. Unlike a conventional trigger definition means, the present trigger definition means 14 can specify as the triggered operation not only updating but also exception generation.

The system directory management means 18 invokes the data manipulation means 15 to reflect the processing by the resource manipulation means 16 to the system directory 13. Unlike a conventional system directory management means, the present system directory management means 18 is not provided with a function to maintain complicated relations among the system tables in the system directory 13.

The data manipulation means 15 may be invoked by the input/output means 19 when the user requests an update of the database 12, by the system directory management means 18 when the user requests a resource manipulation or by the trigger execution means 14 when the triggered operation is to be executed and its content is updating. The data manipulation means 15 invokes the trigger execution means 14 to process triggered operation if necessary. Unlike a conventional data manipulation means, the present data manipulation means 15 is not provided with a function to individually process table or reference constraints.

The database 12, the system directory 13, and the input/output means 19 are the same as those provided in a conventional relational database system.

Figure 2:
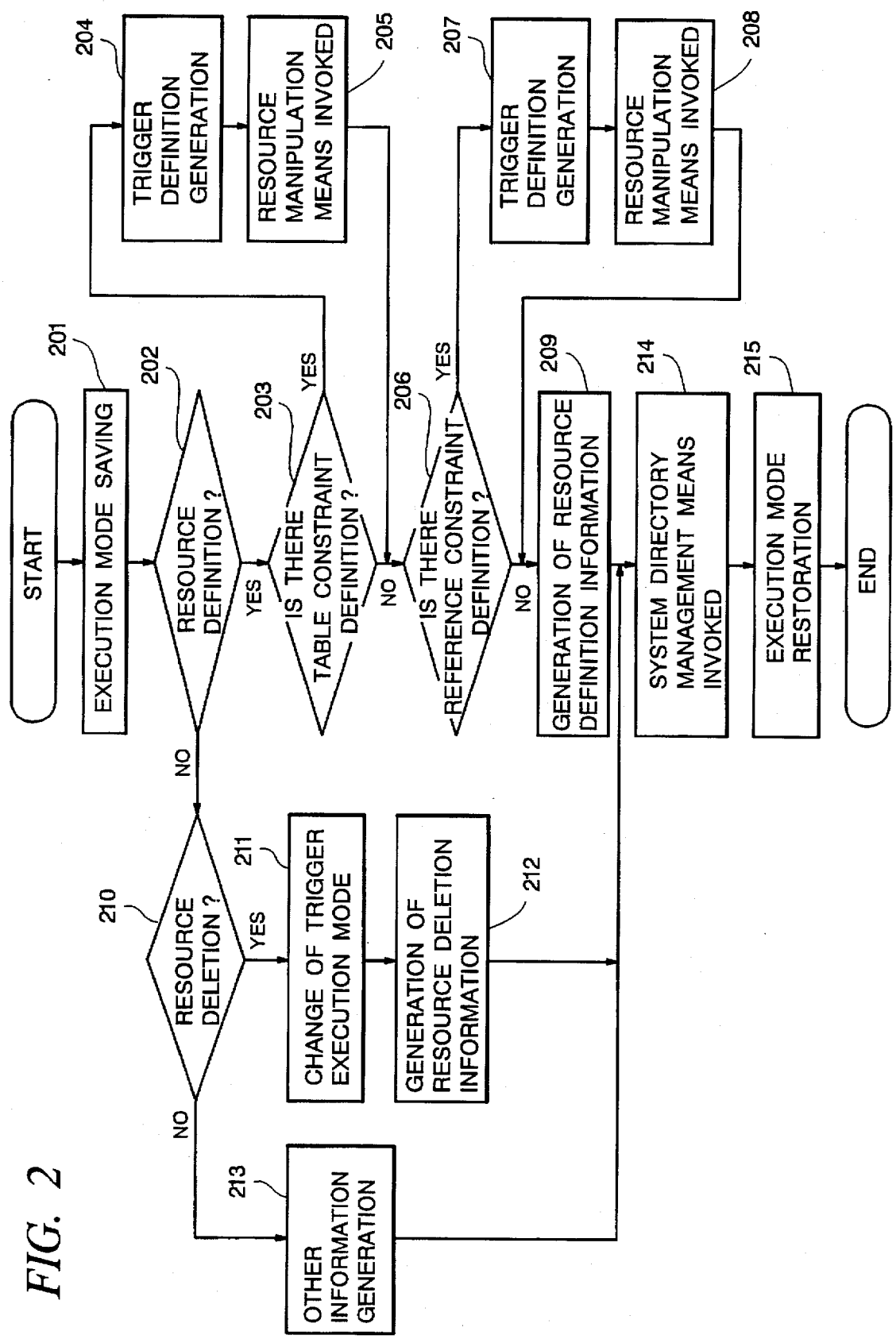
FIG. 2 is a flowchart to illustrate the processing by the resource manipulation means.

FIG. 2 is a flowchart to illustrate the processing flow at the resource manipulation means 16. In the figure, the resource manipulation means 16 firstly saves the current trigger execution mode (Step 201). Next, it judges whether the requested resource manipulation is a resource definition or not (Step 202).

In case resource definition is requested, the system judges whether the resource manipulation request comprises any definition based on table constraints (Step 203). If it does, the system invokes the trigger definition means 17 and internally generates a corresponding trigger definition based on the table constraints (Step 204) and recursively invokes the resource manipulation means 16 to process the generated trigger definition (Step 205). Next, it is judged whether the resource manipulation request comprises any definition based on reference constraints (Step 206). If it does, the trigger definition means 17 is invoked for internal generation of a corresponding trigger definition based on reference constraints (Step 207). Then, the resource manipulation means 16 is recursively invoked for processing of the generated trigger definition.

Based on the resource manipulation request, the resource definition information in a form registrable to the system directory 13 is now generated (Step 209).

If the requested resource manipulation is not a resource definition, the system then judges whether the requested resource manipulation is a resource deletion (such as system table deletion) or not (Step 210). If it is, the contents of the requested resource deletion are analyzed. Then, the trigger execution mode is changed according to the trigger execution mode specified by the resource deletion request (Step 211). Next, based on the resource manipulation request, the resource deletion information in a form registrable to the system directory 13 is now generated (Step 212).

If the requested resource manipulation is neither a resource definition or resource deletion, other type of information in a form registrable to the system directory 13 is generated based on the resource manipulation request (Step 213).

Finally, the system directory management means 18 is invoked (Step 214). The system directory control means 18 invokes the data manipulation means 15 to register the information generated by the above processes to the system directory 13. Then, the system returns the trigger execution mode to the one saved in Step 201 (Step 215), which ends the procedure.

Figure 3A:
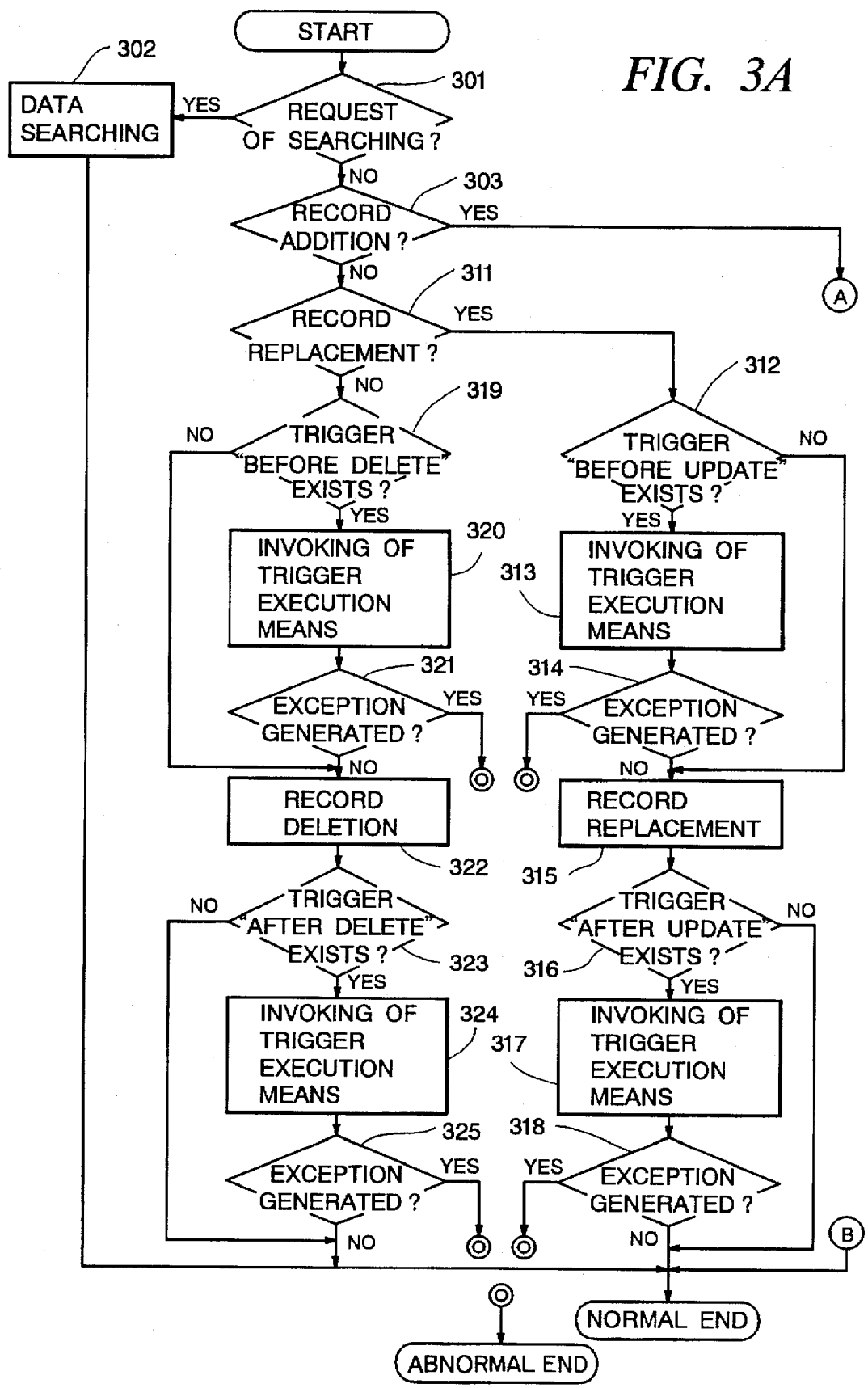
FIGS. 3A and 3B are flowcharts to illustrate the processing by the data manipulation means.
Figure 3B:
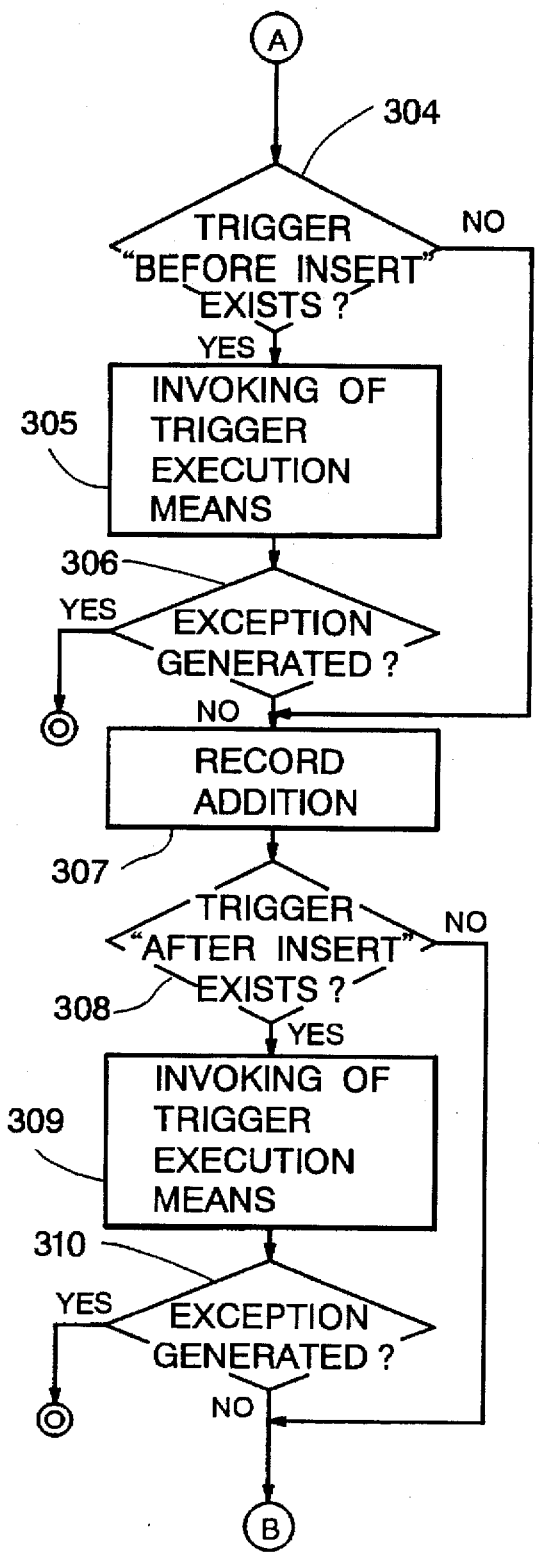

FIGS. 3A and 3B are flowcharts to illustrate the processing flow at the data manipulation means 15. In the figure, the data manipulation means 15 firstly judges whether the requested data manipulation is searching or not (Step 301). It is, data searching is processed (Step 302). For this data search processing, detailed description is omitted since it is the same as that for a conventional relational database management system.

Figure 4:
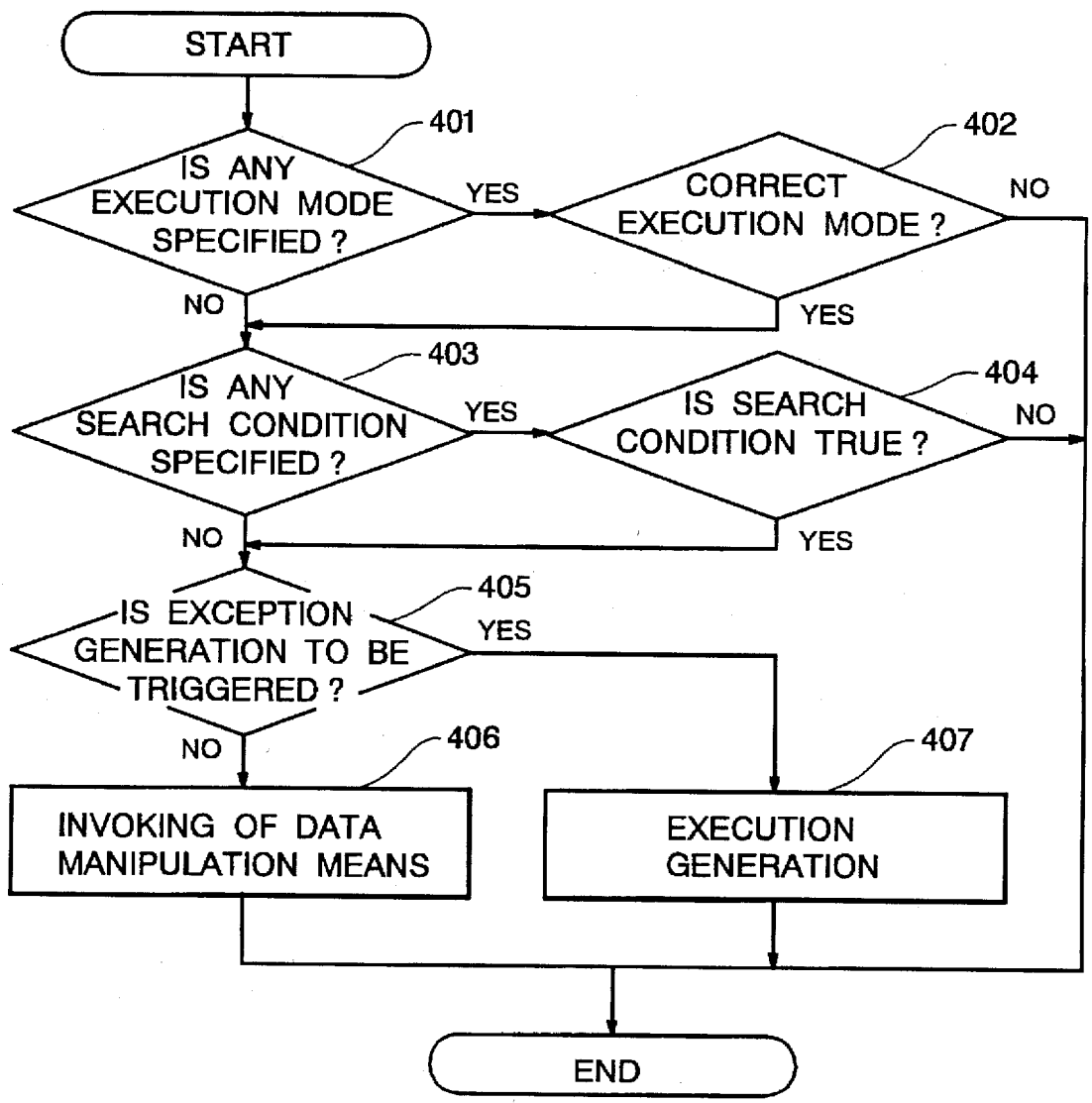
FIG. 4 is a flowchart to illustrate the processing by the trigger execution means.

If the requested data manipulation is not searching, the data manipulation means 15 further judges whether the requested manipulation is a record addition or not (Step 303). If it is, the means 15 then judges whether a trigger definition for processing before record addition (trigger definition specifying "before insert" as the trigger activation timing) exists or not for the table to be updated (Step 304). If such a trigger definition exists, then the means 15 uses it as an argument to invoke the trigger execution means 14 and has it execute the trigger (Step 305). When the trigger execution means 14 is invoked, it is judged whether any exception is generated or not in trigger execution processing (Step 306). If any exception has been generated, the data manipulation procedure makes an abnormal end. FIG. 4 shows the contents of the trigger execution means 14. In case of such abnormal end of the data manipulation, the user is notified of the abnormal end by the message indicating the abnormality contents presented at the input/output means 19 such as the display.

Next, according to the contents of the data manipulation request, a record is added to the table to be updated (Step 307).

Finally, the data manipulation means 15 judges whether a trigger definition for processing after record addition (trigger definition specifying "after insert" as the trigger activation timing) exists or not for the table to be updated (Step 308). If such a trigger definition exists, then the means 15 uses it as an argument to invoke the trigger execution means 14 and has it execute the trigger (Step 309). When the trigger execution means 14 is invoked, it is judged whether any exception is generated or not in trigger execution processing (Step 310). If any exception has been generated, the data manipulation procedure makes an abnormal end. For other cases, the procedure makes a normal end.

If requested data manipulation is not searching or record addition, then the data manipulation means 15 judges whether the requested data manipulation is a record replacement or not (Step 311). If it is, the means 15 then judges whether a trigger definition for processing before record replacement (trigger definition specifying "before update" as the trigger activation timing) exists or not for the table to be updated (Step 312). If such a trigger definition exists, then the means 15 uses it as an argument to invoke the trigger execution means 14 and has it execute the trigger (Step 313). When the trigger execution means 14 is invoked, it is judged whether any exception is generated or not in trigger execution processing (Step 314). If any exception has been generated, the data manipulation procedure makes an abnormal end. In case of such abnormal end of the data manipulation, the user is notified of the abnormal end by the message indicating the abnormality contents presented at the input/output means 19 such as the display.

Next, according to the contents of the data manipulation request, a record in the table to be updated is replaced (Step 315).

Finally, the data manipulation means 15 judges whether a trigger definition for processing after record replacement (trigger definition specifying "after update" as the trigger activation timing) exists or not for the table to be updated (Step 316). If such a trigger definition exists, then the means 15 uses it as an argument to invoke the trigger execution means 14 and has it execute the trigger (Step 317). When the trigger execution means 14 is invoked, it is judged whether any exception is generated or not in trigger execution processing (Step 318). If any exception has been generated, the data manipulation procedure makes an abnormal end. For other cases, the procedure makes a normal end.

If the requested data manipulation is not searching, record addition or record replacement, then it must be record deletion. In this case, the means 15 firstly judges whether a trigger definition for processing before record deletion (trigger definition specifying "before delete" as the trigger activation timing) exists or not in the table to be updated (Step 319).

If such a trigger definition exists, then the data manipulation means 15 uses it as an argument to invoke the trigger execution means 14 and has it execute the trigger (Step 320). When the trigger execution means 14 is invoked, it is judged whether any exception is generated or not in trigger execution processing (Step 321). If any exception has been generated, the data manipulation procedure makes an abnormal end. In case of such abnormal end of the data manipulation, the user is notified of the abnormal end by the message indicating the abnormality contents presented at the input/output means 19 such as the display.

Next, according to the contents of the data manipulation request, a record in the table to be updated is deleted (Step 322).

Finally, the means 15 judges whether a trigger definition for processing after record deletion (trigger definition specifying "after delete" as the trigger activation timing) exists or not for the table to be updated (Step 323). If such a trigger definition exists, then the means 15 uses it as an argument to invoke the trigger execution means 14 and has it execute the trigger (Step 324). When the trigger execution means 14 is invoked, it is judged whether any exception is generated or not in trigger execution processing (Step 325). If any exception has been generated, the data manipulation procedure makes an abnormal end. In case of such abnormal end of the data manipulation, the user is notified of the abnormal end by the message indicating the abnormality contents presented at the input/output means 19 such as the display. For other cases, the procedure makes a normal end.

FIG. 4 is a flowchart to illustrate the processing flow of processing at the trigger execution means 14. In the figure, the trigger execution means 14 firstly judges whether the designated trigger definition has any execution mode specified or not (Step 401). If an execution mode is specified, it further judges whether the execution mode designated by the update request and the execution mode specified in the trigger definition are the same or not (Step 402). If not, the procedure is terminated.

If any execution mode is not specified, or if the execution mode designated by the update request is the same as the one specified in the trigger definition, then it is further judged whether any trigger search condition is given or not (Step 403). If such a trigger search condition exists, then it is judged whether the condition is true or false (Step 404). If any trigger search condition is not given, or if the trigger search condition is true, the trigger execution means 14 judges whether the triggered operation is an exception generation or not (Step 405).

If the triggered operation is an exception generation, then the specified exception is generated (Step 407) with terminating the procedure. If the triggered operation is not an exception generation, it must be an update. The means 14 invokes the data manipulation means 15 for processing according to the triggered operation (Step 406) and terminates the procedure.

FIGS. 5A to 5C give examples of trigger definitions. FIG. 5A defines a trigger called TRG1, FIG. 5B a trigger TRG2 and FIG. 5C a trigger TRG3.

The trigger TRG1 in FIG. 5A is a trigger definition for deletion of a record from the "Employee" table. It defines an operation to change the values at the "Superior" column to NULL for all records having, at the "Superior" column, the same value as that at the "Employee number" column of the record to be deleted, when the record to be deleted has a value other than NULL at the "Title" column. This trigger TRG1 can be defined in a conventional relational database system.

The trigger TRG2 in FIG. 5B is a trigger definition for addition of a record to the "Employee" table. It defines an operation to check whether the value at the "Assignment" column of the "Employee" table is included in the group of values appearing at the "Section number" column of the "Section" table and, if not, generate a certain exception "CONSTRAINT VIOLATION". Upon generation of such an exception, the message "CONSTRAINT VIOLATION" is presented at the input/output means 19 to notify the user of the exception generation. Such a trigger TRG2 is not defined in a conventional relational database system.

The trigger TRG3 in FIG. 5C is a trigger definition for deletion of a record from the "Employee" table. It defines an operation which is effective only when the trigger execution mode is RESTRICT: if any record has, at the "Superior" column of the "Employee" table, the same value as the "Employee number" column of the record to be deleted, a certain exception "RESTRICT VIOLATION" is generated. Upon generation of such an exception, the message "RESTRICT VIOLATION" is presented at the input/output means 19 to notify the user of the exception generation. Such a trigger TRG3 is not defined in a conventional relational database system. This trigger TRG3 is activated only if the trigger operation mode "RESTRICT" is specified upon deletion is requested as data manipulation.

FIG. 6 shows an example of table constraint which can be defined in a relational database system. This constraint defines that the value at the "Employee number" column of the "Employee" table should be from 1 to 999999. If a record with a value violating this constraint is added, or any record is updated with a value violating this constraint, then the system generates an exception and the data update request is terminated with an abnormal end.

FIG. 7A shows an example of reference constraint which can be defined in a relational database system. This constraint defines that the "Assignment" column of the "Employee" table refers to the "Section number" column of the "Section" table. This limits the values at the "Assignment" column of the "Employee" table to those included in the group of values at the "Section number" column of the "Section" table. If any data update manipulation which violates this constraint is requested, then the system makes an abnormal end for data updating procedure.

Besides, "ON UPDATE CASCADE" specification means that, if a value at the "Section number" column of the "Section" table is changed, all records in the "Employee" table having the value before such change at the "Assignment" column are automatically changed to have the same value as the "Section number" column after the change.

The reference constraint definition of FIG. 7A does not have any "ON DELETE" specification. Accordingly, when a record is deleted from the "Section" table, exceptions may be generated for the records in the "Employee" table having at the "Assignment" column the same value as the "Section number" column of the record to be deleted.

FIG. 7B shows a specific example of a set of a "Section" table and an "Employee" table based on the reference constraint shown in FIG. 7A. As shown in the figure, the "Assignment" column of the "Employee" table refers to the "Section number" of the "Section" table.

FIG. 8A shows a method to manage the information on the relation between the BASE table and the VIEW table in the system directory 13 in a relational database system. The system directory 13 is provided with a "TABLES" table to store the information on the tables (both BASE and VIEW tables) and a "VIEW TABLE USAGE" table to store relations between the VIEW and BASE tables.

Figure 8B:
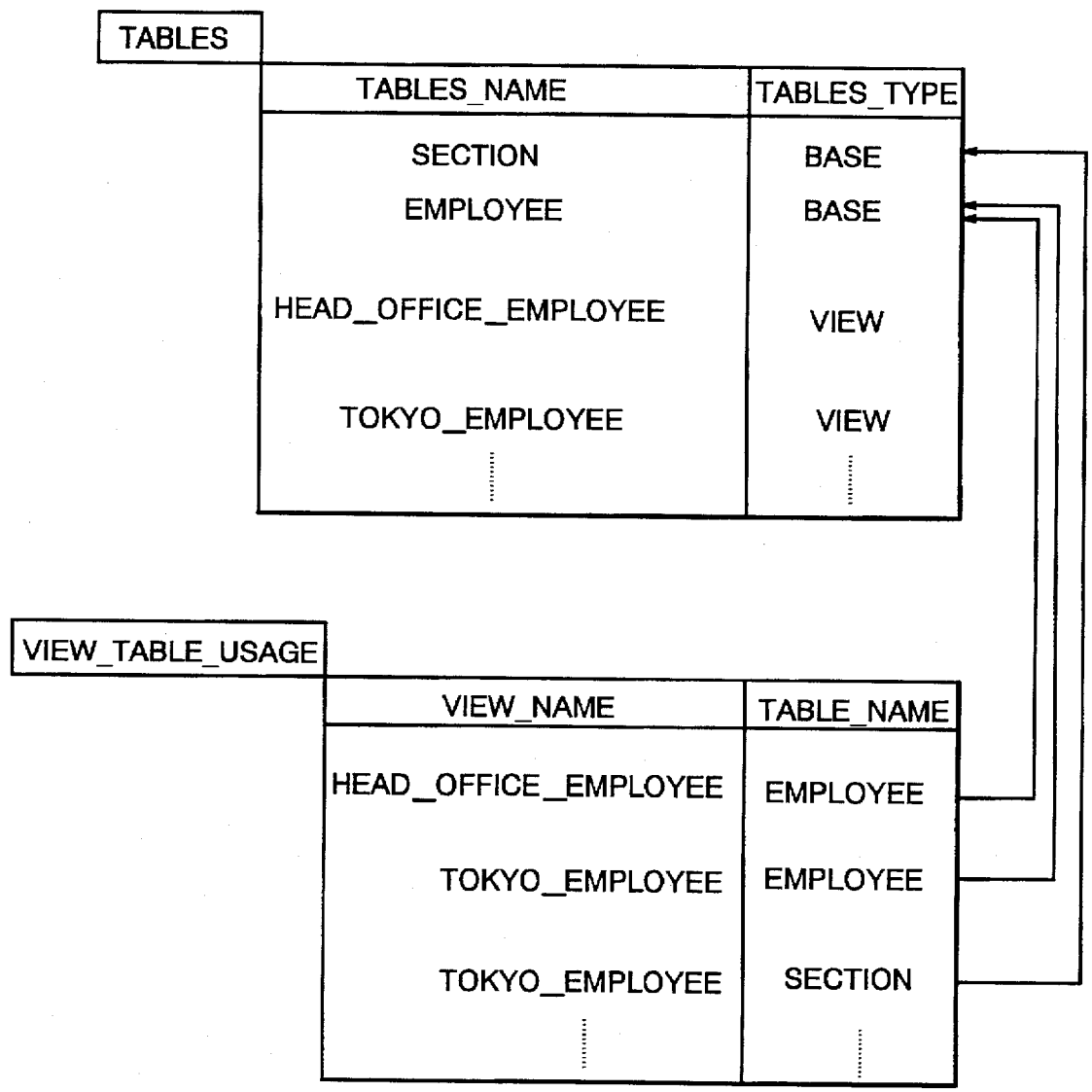

If "Head office employee" and "Tokyo employee" are defined to be VIEW tables as in FIG. 8A, "TABLES" has not only information on "Section" and "Employee" as the BASE table information but also "Head office employee" and "Tokyo employee" as the VIEW table information. The "VIEW TABLE USAGE" stores the information indicating that the VIEW table "Head office employee" is made from the BASE table "Employee" and the VIEW table "Tokyo employee" is made of the BASE table "Employee" and the "Section". FIG. 8B shows a specific example of "TABLES" and "VIEW TABLE USAGE".

FIG. 9 shows an example of trigger definition generated based on table constraints. The table constraints shown here has the same contents as in FIG. 6.

The generated trigger definition defines an operation where, upon addition of a record to the "Employee" table, the system checks the value at the "Employee number" column to see if it falls in the range from 1 to 999999, and if not, a certain exception "CONSTRAINT VIOLATION" is generated. This trigger is executed in all operation modes.

FIG. 10A and 10B show an example of trigger definition generated based on reference constraints. In this example, three triggers are generated: "Employee FK INS 001", "Employee FK UPD 001", and "Employee FK DEL 001". The reference constraints here have the same contents as those shown in FIG. 7.

According to the "trigger FK INS 001", when a record is added to the "Employee" table, the system judges whether the value at the "Assignment" column is included in the group of values appearing at the "Section number" column of the "Section" table and if not, generates a certain exception "REFERENTIAL CONSTRAINT VIOLATION". When such an exception is generated, the message "REFERENTIAL CONSTRAINT VIOLATION" is presented at the input/output means 19 to notify the user of the exception generation.

According to the "trigger FK UPD 001", when a value at the "Section number" column of the "Section" table is changed, all records in the "Employee" table having the value before the change at the "Assignment" column are changed to have, at the "Assignment" column, the same value as the "section number" column after change.

According to the trigger "Employee FK DEL 001", when a record is deleted from the "Section" table, existence of a record in the "Employee" table having, at the "Assignment" column, the same value as the "Section number" column of the record to be deleted causes generation of a certain exception "RESTRICT VIOLATION".

These triggers are executed in all operation modes.

FIG. 11 shows an example of trigger definition defined for the system directory 13. This example is for the relation between the "TABLES" and the "VIEW TABLE USAGE" shown in FIG. 8 here.

For a table deletion request to the resource manipulation means 16, CASCADE or RESTRICT may be specified as operation (execution) mode. When the execution mode CASCADE is specified, the resources related to that table (VIEW table defined based on that table, for example) are deleted at the same time. In contrast, when the execution mode RESTRICT is specified, existence of a resource related to that table causes an exception to be generated resulting in abnormal end of the deletion procedure. To realize such operation, "TABLES DEL 001" and "TABLES DEL 002" are defined as triggers as shown in FIG. 11.

According to the trigger "TABLES DEL 001", when a record is deleted from "TABLES", if a record of "VIEW TABLE USAGE" having, at the "TABLE NAME" column, the same value as the "TABLE NAME" column of the record to be deleted, a certain exception "REFERENCED OBJECT STILL EXISTS" is generated. This trigger is executed only when the trigger execution mode is RESTRICT.

According to "TABLES DEL 002", when a record is deleted from "TABLES", the records having, at "TABLE NAME" column, the same value as the "TABLE NAME" column of the record to be deleted in the "VIEW TABLE USAGE" and the records having at "TABLE NAME" column the same value as the "TABLE NAME" column of the above "VIEW TABLE USAGE" records in "TABLES" are deleted. This trigger is executed only when the trigger execution mode is CASCADE.

According to the present invention, table constraints and reference constraints processing and management of the system directory 13 utilize triggers, which can simplify the processing at the data manipulation means and the system directory management means. This improves quality and facilitates maintenance as a result of simplified processing. Though the database system cannot be customized with a conventional system directory management means, the present invention easily realizes such customization by utilizing trigger definitions for the system directory tables. Database system customization for resource manipulation includes, for example, generation of history table to record the deletion history for tables and indices of the system directory. In this case, a function to generate a history table can be added to the present invention by defining a triggered operation.

Obviously, various modifications can be made to the above embodiments. It is intended to cover in the appended claims all such modifications and variations as fall within the true spirit and scope of the present invention.

What is claimed is:

1. A relational database management system comprising:
   a relational database to store a plurality of tables;
   data manipulation means for updating a record in one of the tables in said database upon receipt of an update request for said record;
   trigger definition means for supplying a trigger definition of an activation condition and contents of a triggered operation activated upon execution of the update request for said table, and for generating the trigger definition to cause an exception to be generated for the update request against a plurality of constraints given to said table; and
   trigger execution means for activating the triggered operation according to the trigger definition given by said trigger definition means, processing the triggered operation by invoking said data manipulation means, and executing exception generation without invoking said data manipulation means for the update request if the update request violates one of the plurality of constraints given to said table according to the trigger definition generated by said trigger definition means, wherein said data manipulation means invokes said trigger execution means when said trigger definition exists for the table when it is to be updated by the update request, and aborts update processing for the table when the exception generated is executed by said trigger execution means.

2. A relational database management system of claim 1 wherein said trigger definition means specifies a trigger operation mode as the activation condition for execution of the triggered operation, and said trigger execution means executes the triggered operation only when the trigger operation mode designated by the update request is equal to the trigger operation mode specified in the trigger definition, and said trigger execution means does not execute the triggered operation when the trigger operation mode designated by the update request and the trigger operation mode specified in the trigger definition are not equal.

3. A relational database management system of claim 1 wherein said trigger definition means defines the contents of a triggered operation based on reference constraints given for the plurality of tables defined in said database, and said trigger execution means invokes said data manipulation means and processes the triggered operation based on a one of the reference constraints generated by said trigger definition means and executes exception generation when the update request is against said one of the reference constraints.

4. A relational database management system of claim 3 wherein said trigger definition means specifies a trigger operation mode as the activation condition for execution of the triggered operation, and said trigger execution means executes the triggered operation only when the trigger operation mode designated by the update request is equal to the trigger operation mode specified in the trigger definition, and said trigger execution means does not execute the triggered operation when the trigger operation mode designated by the update request and the trigger operation mode specified in the trigger definition are not equal.

5. A relational database management system comprising:
   a relational database to store a plurality of first tables;
   a system directory to store as system tables information on resources including a plurality of second tables, columns and indices defined in said database, relations among said resources, and access privileges for said resources;
   data manipulation means for updating of records in the plurality of first tables including addition, replacement and deletion for the plurality of first tables in said database and updating of said system directory;
   trigger definition means for supplying a trigger definition of an activation condition and contents of a triggered operation activated upon execution of the update request for said table, and defining the triggered operation based on the relations stored in the system tables in said system directory;
   trigger execution means for activating the triggered operation according to the trigger definition given by said trigger definition means, processing the triggered operation by invoking said data manipulation means;
   resource manipulation means for processing resource manipulations; and
   system directory management means for storing in the system tables a result of resource manipulation processing by said resource manipulation means by invoking said data manipulation means.

6. A relational database management system of claim 5 wherein said trigger definition means specifies a trigger operation mode as the activation condition for execution of the triggered operation, and said trigger execution means executes the triggered operation only when the trigger operation mode designated by the update request is equal to the trigger operation mode specified in the trigger definition and said trigger execution means does not execute the triggered operation when the trigger operation mode designated by the update request and the trigger operation mode specified in the trigger definition are not equal.

7. A relational database management system of claim 6 wherein said trigger definition means further defines a plurality of trigger operation modes and a triggered operation for each operation mode, and said trigger execution means executes, only when the trigger operation mode designated by the update request and the trigger operation mode specified in the trigger definition are equal, a triggered operation corresponding to said trigger operation mode selectively and said trigger execution means does not execute the triggered operation when the trigger operation mode designated by the update request and the trigger operation mode specified in the trigger definition are not equal.

8. A relational database management system of claim 5 wherein said trigger definition means generates a definition which causes an exception for an update request against a constraint given to said system tables and said trigger execution means which, based on the definition by said trigger definition means, executes exception generation without invoking said data manipulation means upon processing the update request against the constraint given to said system table.

9. A relational database management system of claim 5 wherein said trigger definition means defines the contents of a triggered operation based on reference constraints given for the plurality of second tables defined in said database, and said trigger execution means invokes said data manipulation means and processes the triggered operation based on a reference constraint defined by said trigger definition means and executes exception generation when an update request is against said reference constraint.

10. A relational database management system of claim 5, wherein said resource manipulations include resource definition, resource deletion, privilege grant and privilege revoke.

11. A relational database management system comprising:
a relational database to store a plurality of tables;
data manipulation means for updating a record in one of the tables in said database upon receipt of an update request for said record;
trigger definition means for supplying a trigger definition of an activation condition and contents of a triggered operation activated upon execution of the update request for said table, and for defining the contents of a triggered operation based on a plurality of reference constraints given to a plurality of tables in said database; and
trigger execution means for activating the triggered operation according to the trigger definition given by said trigger definition means, processing the triggered operation by invoking said data manipulation means, wherein said trigger definition means defines the contents of a triggered operation based on reference constraints given for a plurality of tables defined in said database, and said trigger execution means invoking said data manipulation means and processing the triggered operation based on the one of the reference constraints generated by said trigger definition means and executes exception generation when the update request is against said one of the reference constraints.

12. A relational database management system of claim 11 wherein said trigger definition means specifies a trigger operation mode as the activation condition for execution of the triggered operation, and said trigger execution means executes the triggered operation only when the trigger operation mode designated by the update request is equal to the operation mode specified in the trigger definition and said trigger execution means does not execute the triggered operation when the trigger operation mode designated by the update request and the trigger operation mode specified in the trigger definition are not equal.

* * * * *